United States Patent
Tiley et al.

(10) Patent No.: US 7,020,623 B1
(45) Date of Patent: Mar. 28, 2006

(54) METHOD OF INDUCING A PURCHASER TO VISIT A RETAIL OUTLET AT A REMOTE LOCATION AND OF INDUCING A RETAIL OUTLET TO ACT AS SUCH A REMOTE LOCATION

(75) Inventors: Stephen D. Tiley, 6 Todd Rd., Carlisle, PA (US) 17013; Rodney S. Smith, Boiling Springs, PA (US)

(73) Assignee: Stephen D. Tiley, Carlisle, PA (US)

( * ) Notice: Subject to any disclaimer, the term of this patent is extended or adjusted under 35 U.S.C. 154(b) by 722 days.

(21) Appl. No.: 09/707,185

(22) Filed: Nov. 6, 2000

Related U.S. Application Data

(60) Provisional application No. 60/163,642, filed on Nov. 4, 1999, provisional application No. 60/167,160, filed on Nov. 23, 1999, provisional application No. 60/173,739, filed on Dec. 30, 1999, provisional application No. 60/193,525, filed on Mar. 31, 2000.

(51) Int. Cl.
*G06Q 30/00* (2006.01)
(52) U.S. Cl. .......................................... 705/26; 705/14
(58) Field of Classification Search .................. 705/14, 705/26, 27
See application file for complete search history.

(56) References Cited

U.S. PATENT DOCUMENTS

| | | | | |
|---|---|---|---|---|
| 4,797,818 A | * | 1/1989 | Cotter ........................... | 705/15 |
| 5,353,218 A | * | 10/1994 | De Lapa et al. .............. | 705/14 |
| 5,758,328 A | * | 5/1998 | Giovannoli ................... | 705/26 |
| 5,832,457 A | * | 11/1998 | O'Brien ........................ | 705/14 |
| 5,930,764 A | | 7/1999 | Melchione et al. ........... | 705/10 |
| 5,948,061 A | | 9/1999 | Merriman et al. ........... | 709/219 |
| 5,966,695 A | | 10/1999 | Melchione et al. ........... | 705/10 |
| 5,970,469 A | | 10/1999 | Scroggie et al. .............. | 705/14 |
| 5,974,396 A | | 10/1999 | Anderson et al. ............. | 705/10 |

(Continued)

FOREIGN PATENT DOCUMENTS

JP  11-66176 A  *  3/1999

OTHER PUBLICATIONS

Fox, B., "Not Just the Design Is Incredible; Ssytems Provide Showmanship at Incredible Universe," Chain Store Age Executiv with Shopping Center Age, vol. 70, No. 1, p. 89, Jan. 1994.*

(Continued)

*Primary Examiner*—Nicholas D. Rosen
(74) *Attorney, Agent, or Firm*—The Webb Law Firm, P.C.

(57) ABSTRACT

A method is defined for inducing a purchaser to visit a store at a remote location subsequent to the purchase of a product from a supplier to pick up or to return the product. This is done by providing incentives to the purchaser to induce him or her to visit an outlet. The level of inducement may be determined by the desire of the outlet to have that purchaser visit their store. Additionally, the method may include inducing a retail outlet to act as a remote location for product pick up or return by the purchaser by providing direct marketing opportunities to the retail outlet. The method offers a unique direct marketing system for general advertisers and allows marketing to an individual known to be coming to a particular location within a known time frame.

50 Claims, 4 Drawing Sheets

U.S. PATENT DOCUMENTS

| | | | | |
|---|---|---|---|---|
| 5,995,942 | A | 11/1999 | Smith et al. | 705/14 |
| 6,014,634 | A | 1/2000 | Scroggie et al. | 705/14 |
| 6,026,369 | A | 2/2000 | Capek | 705/14 |
| 6,029,141 | A | 2/2000 | Bezos et al. | 705/27 |
| 6,076,069 | A | 6/2000 | Laor | 705/14 |
| 6,078,897 | A | 6/2000 | Rubin et al. | 705/14 |
| 6,085,170 | A | 7/2000 | Tsukuda | 705/26 |
| 6,119,098 | A | 9/2000 | Guyot et al. | 705/14 |
| 6,131,087 | A | 10/2000 | Luke et al. | 705/26 |
| 6,134,548 | A | 10/2000 | Gottsman et al. | 707/5 |
| 6,138,911 | A | 10/2000 | Fredregill et al. | 235/383 |
| 6,249,772 | B1* | 6/2001 | Walker et al. | 705/26 |
| 6,381,582 | B1* | 4/2002 | Walker et al. | 705/26 |
| 6,688,435 | B1* | 2/2004 | Will et al. | 186/35 |
| 6,741,968 | B1* | 5/2004 | Jacoves et al. | 705/14 |
| 6,754,636 | B1* | 6/2004 | Walker et al. | 705/26 |
| 6,853,461 | B1* | 2/2005 | Shiimori | 358/1.15 |
| 6,954,735 | B1* | 10/2005 | Djupsjobacka et al. | 705/27 |
| 2001/0037207 | A1* | 11/2001 | Dejaeger | 705/1 |
| 2001/0042024 | A1* | 11/2001 | Rogers | 705/26 |
| 2002/0004782 | A1* | 1/2002 | Cincotta | 705/39 |
| 2002/0099622 | A1* | 7/2002 | Langhammer | 705/26 |
| 2002/0178071 | A1* | 11/2002 | Walker et al. | 705/26 |

OTHER PUBLICATIONS

Elson, J., "Chains Testing Shipping Center, Disney Event," Supermarket News, vol. 46, No. 47, p. 50+, Nov. 18, 1996.*

Anon., "MICROSOFT: The Microsoft Plaza Brings Product Returns Convenience to Online Shoppers," Business Wire, Dec. 1, 1997.*

Galler, B.A., "IP: NYT Digital Commerce: Is Delivery the DealBreaker for E-commerce," Usenet post, newsgroup umich.interesting.people, Mar. 3, 1998.*

Anon., "Riding the Internet How Much Will It Cost to Get on, How Far Can It Take You and Are You Sure You're Ready?" Supermarket News, vol. 48, No. 25, p. 71, Jun. 22, 1998.*

Pages from www.PackageNet.com, as of Apr. 20, 1999.*

Squires, S., "Effective Credit Marketing: Recovering from the Recession" (Abstract only), Credit Management, pp. 23-24, Jan. 1992.*

Anon., "BTnet Background—The BTnet Network," M2 Presswire, Jan. 11, 1995.*

Garau, R., "Selling Better Bedding," HFN, Weekly Newspaper for the Home Furnishing Network, vol. 71, No. 6, p. 18, Feb. 10, 1997.*

Chain Store Age publication, Jul. 1, 1999, p. 168, Article titled "Now that's Fresh" (2 pages.).

Harrisburg Patriot News, Jun. 4, 2000, pp. D1 and D11, Article titled "Services Fix Weak Spots In Online Retail Process" (2 pages.).

Wall Street Journal, Jun. 21, 2000, p. B11, Article titled "Shoppers Find Blowout Sale On Net Is Over" (2 pages.).

Miscellaneous pages printed on Jun. 5, 2000 from Internet site Paxzone.com (17 pages.).

Chicago Sun Times, Nov. 29, 1999, Article titled "Shipments Shape Up" (2 pages.).

Paxzone.com literature received from Paxzone in Jun. of 2000 (undated) (5 pages).

Article titled "In Japan, the Hub of E-Commerce Is a 7-Eleven" from the Wall Street Journal dated Nov. 1, 1999 (2 pages).

Article titled "Ebay Teams with Boxed Etc. and Iship.com to Provide Person-to-Person E-Commerce Shipping Solutions" dated Apr. 12, 2999 from Internet site www.mbe.com (2 pages).

Page titled "Shop and Learn" printed Dec. 6, 1999 from Internet site www.circuitcity.com (1 page).

Page entitled "PackageNet 3,000 Convenient Locations Nationwide" printed Jan. 4, 2000 from Internet site www.packagenet.com (1 page).

Pages entitled "PackageNet Web Kit" printed Jan. 11, 2000 from Internet site www.packagenet.com (3 pages).

Page entitled "MSN Shopping Offers Convenient, Helpful Shopping Tools in Time for Holiday Rush" printed Jan. 4, 2000 from Internet site www.microsoft.com (1 page).

Article entitled "PackageNet Boosts Home Delivery" from The Forrester Brief dated Apr. 30, 1998 (2 pages).

Forbes Magazine article entitled "Amazon.malls" dated Jun. 12, 2000 (2 pages).

Forbes Magazine articles entitled "Shop Till You Flop"dated Jan. 22, 2001 (1 page).

Paxzone.com, Jun. 6, 2000, Miscellaneous pages from Web Site.

Chicago Tribune, Nov. 29, 1999, Article titled "Shipments Shape Up".

Chain Store Age publication, Jul. 1, 1999, p. 168, Article titled "Now that's Fresh".

Harrisburg Patriot News, Jun. 4, 2000, pp. D1 and D11, Article titled "Services Fix Weak Spots In Online Retail Process".

Wall Street Journal, Jun. 21, 2000, p. B11, Article titled "Shoppers Find Blowout Sale On Net Is Over".

* cited by examiner

METHOD OF INDUCING A PURCHASER TO VISIT A RETAIL OUTLET AT A REMOTE LOCATION AND OF INDUCING A RETAIL OUTLET TO ACT AS SUCH A REMOTE LOCATION

CROSS-REFERENCE TO RELATED APPLICATIONS

This application claims the benefit of:
1) U.S. Provisional Application No. 60/163,642 filed Nov. 4, 1999 titled "Method, Apparatus, And Program Matching Electronic And Telephonic Shoppers To Physical Stores For Package Pickup";
2) U.S. Provisional Application No. 60/167,160 filed Nov. 23, 1999 titled "Method Of Inducing A Purchaser To Visit A Store At A Remote Location";
3) U.S. Provisional Application No. 60/173,739 filed Dec. 30, 1999 titled "Further Methods Of Inducing A Purchaser To Visit A Store At A Remote Location For Package Pickup And Marketing Opportunities"; and
4) U.S. Provisional Application No. 60/193,525 filed Mar. 31, 2000 titled "Method Of Inducing A Purchaser To Visit A Remote Location And Of Inducing A Retail Outlet To Act As Such A Remote Location".

BACKGROUND OF THE INVENTION

1. Field of the Invention

The invention is directed to a method of inducing a purchaser to visit a retail outlet for pick up or return of a product at a remote location. The invention is also directed to a method of inducing a retail outlet to act as such a remote location. The invention is also directed to a method of creating the opportunity of direct marketing to a customer known to be coming to a predefined location within a predefined time frame.

2. Description of the Prior Art

With the propagation of electronic commerce in society today, the need for methods of delivery and return of purchased products becomes even more important. In the past, a purchaser had the option of receiving a product through direct delivery whether it was through the U.S. Postal Service or a commercial carrier. The purchaser additionally had the option of having the purchased product shipped to an outlet directly affiliated with the supplier of the product. However, frequently a delivery directly to the residence of the purchaser was not practical since the purchaser was required to be home to receive such a purchase or to make arrangements with a neighbor to receive such a purchase. Furthermore, although the purchaser sometimes has the option of picking up the product at an affiliated outlet location, such locations may not be nearby and, therefore, not provide an attractive alternative to the purchaser.

A method is needed whereby the purchaser would benefit by traveling to a remote location and, for that reason, select such a remote location.

Furthermore, while remote locations, or stores, can provide convenient locations for package pick up they need an incentive to do so. Current consumer marketing is through mass media directed to a broad range of consumers, only some of which will have an interest in the products or services marketed. Direct telephone, mail or e-mail campaigns are made to broad groups identified by general interest levels. With the advent of electronic commerce, marketing will become more targeted to groups of consumers likely to have an interest in the product or service being sold. However, with all existing marketing methods the product seller must first convince the consumer to come to the store and the product seller has little or no control over when the consumer may visit the store. Better methods are needed to market to consumers just prior to a store visit as well as during and after such a visit.

Better methods are also needed to allow electronic commerce and traditional physical commerce to work together. A method is needed which will allow the physical store to capitalize on the electronic commerce purchase by using that purchase to build physical store floor traffic and to provide cross-selling opportunities. Conversely, a method is needed to provide electronic commerce with physical outlet options for package delivery and return.

SUMMARY OF THE INVENTION

The invention creates an opportunity of direct marketing to individuals known in advance to be coming to a particular retail outlet.

A first embodiment of the invention is directed to a method of inducing a purchaser to visit a store at a remote location upon the purchase or return of a product from a supplier comprising the steps of:
 a) evaluating at least one retail outlet as a remote location, wherein each outlet may provide a benefit to the purchaser;
 b) selecting at least one of those remote locations for identification to the purchaser;
 c) identifying to the purchaser at least one of the retail outlets and the associated benefit for pick up or return of the product; and
 d) permitting the purchaser to select an outlet to pick up or return the product.

A second embodiment of the invention is directed to a method of inducing a purchaser to visit a store at a remote location upon the purchase of a product from a supplier to pick up or to return the product comprising the steps of:
 a) identifying a plurality of remote locations as potential outlets;
 b) identifying a plurality of purchaser benefits that may be desired by a purchaser for selecting an outlet;
 c) evaluating each remote location relative to each purchaser benefit; and
 d) identifying to the purchaser one or more of the potential outlets and the correlation of the outlet to the benefits, thereby permitting the purchaser to select an outlet based upon one or more benefits.

A third embodiment of the invention is directed to a method of inducing a purchaser to visit a store at a remote location upon the purchase of a product from a supplier to pick up or to return the product comprising the steps of:
 a) identifying a plurality of remote locations as potential outlets;
 b) identifying a plurality of purchaser benefits that may be desired by a purchaser for selecting an outlet;
 c) evaluating each remote location relative to each purchaser benefit;
 d) identifying a plurality of outlet benefits that may be desired by an outlet serving the purchaser;
 e) evaluating each purchaser relative to each outlet benefit;
 f) selecting one or more remote locations based upon a combination of purchaser benefits and outlet benefits;
 g) assigning a weight to each purchaser benefit and each outlet benefit; and h) identifying such selected locations to the purchaser.

A fourth embodiment of the invention is directed to a method of inducing retail outlets to act as remote locations for product pick up or return by the purchaser comprising the steps of:
   a) evaluating at least one retail outlet as a remote location, wherein each outlet may provide at least one benefit to the purchaser;
   b) selecting at least one of those remote locations as suitable to the purchaser;
   c) identifying to the purchaser at least one of the retail outlets and at least one associated benefit for pick up or return of the primary product;
   d) permitting the purchaser to select an outlet from those identified to pick up or return the primary product;
   e) assembling a purchaser profile based upon information about the purchaser; and
   f) providing some or all of the information in the purchaser profile to the retail outlet for direct marketing by the retail outlet to the purchaser.

The information for the purchaser profile may be extracted from information provided by the purchaser that is necessary for processing the purchase order and for delivery of the product to a retail outlet.

The information for the purchaser profile may also be extracted from information provided by the purchaser based upon personal information beyond that necessary for processing the purchase order and for delivery of the product to a retail outlet.

A fifth embodiment of the invention is directed to direct marketing to individuals visiting a store at a remote location for pick up or return of a pre-ordered product comprising the steps of:
   a) receiving information about the individual prior to the store visit;
   b) using this information to direct market to the individual before, during or after the store visit.

A sixth embodiment is directed to a method of direct marketing to individuals visiting a store at a remote location to send a product to or pick up a product sent from another destination comprising the steps of:
   a) receiving information about the individual prior to the store visit;
   b) using this information to direct market to the individual before, during or after the store visit.

DETAILED DESCRIPTION OF THE PREFERRED EMBODIMENT

Figure 1:
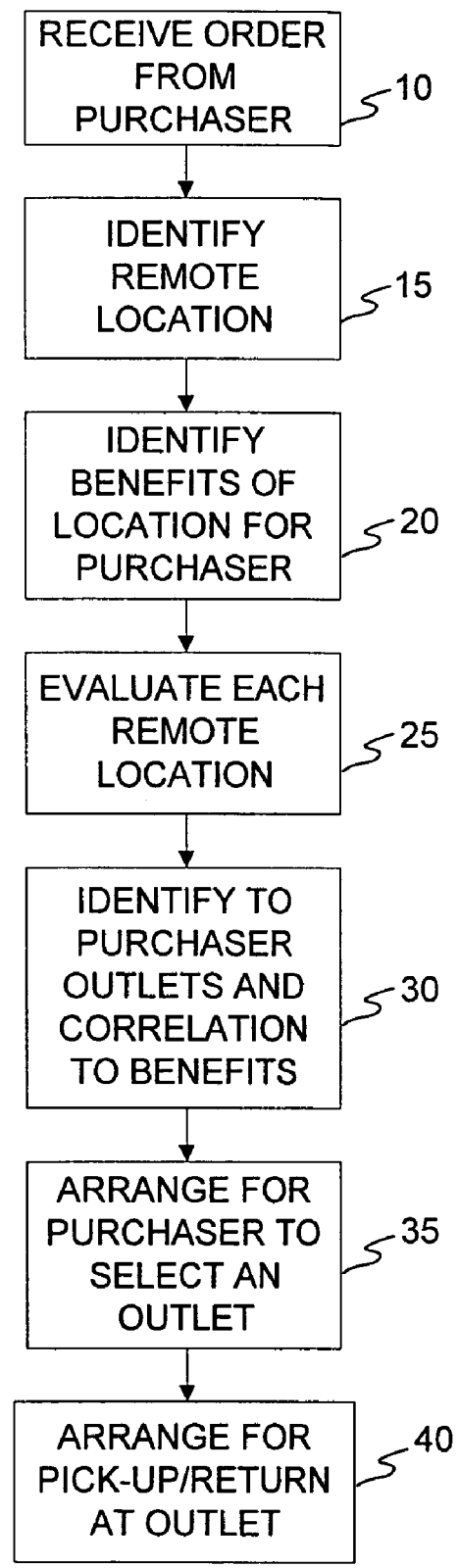
FIG. 1 is a flow chart illustrating one embodiment of the subject invention whereby the purchaser is induced to select a retail outlet.

Throughout this application, certain terms will be applied and the following definitions will add clarity to those terms.

The term "purchaser" or "customer" is an individual who, through the use of the administrator, will be visiting a retail outlet to pick up, or drop off, a product.

The term "supplier" or "seller" means a source, whether ultimate or intermediate, of goods and includes, for example but not limited to, Internet sellers, catalog sellers, telephone sellers, and auction sellers at an Internet or other auction site, the Internet or other auction site itself, an Internet or other electronic cooperative, groups of sellers, common sales site, on-line mall or a similar combination of sellers, and the like.

The term "retail outlet" shall mean any commercial or non-commercial physical site open to the public. The term shall include not only all types of retail stores, but also, by way of example and not limitation, any financial institution, office, kiosk, mall or shopping center.

Furthermore, as used in this application the term "remote location" shall include one or more retail outlets presented to or identified to the purchaser for product pick up or return.

The term "product" shall mean any item which a purchaser desires to have shipped to himself/herself or to be returned or sent by him/her. The product may be either a private shipment such as a gift, or it may be a commercial shipment of an item purchased by the purchaser from an Internet site, catalog or other seller.

The term "retailer" represents a business entity which owns a retail outlet that may be used for product pick up by a purchaser.

"Product pick up" is the process of a retail outlet accepting and holding, either itself or through the use of automated package pick up boxes, the purchaser's product and then the purchaser coming to that retail outlet and physically receiving the product.

"A carrier" is any commercial package carrier. The carrier could be the administrator itself, a retailer's distribution system or a product carrier unrelated to either.

"Advertising" or "marketing" means any means of communication with the purchaser of product information, marketing promotions, discount coupons, or a message. Advertising may be Web page based or e-mail based or based upon any other medium of written, audio or visual communication which is directed at or accessed by the purchaser and not generally published. The term includes any advertising directed to an identified purchaser during the viewing of television or similar productions through an interactive device, and similarly during the use of hand-held audio and/or visual, interactive devices.

"Interactive device" is any means of communication whereby the recipient of the communication is identified and specific information, entertainment, or marketing may be sent to that recipient.

"E-mail" shall include not only e-mail, as it is commonly used as of the date of this application, but also shall include any audio or video e-mail now or hereafter implemented. E-mail shall include a textual, audio, or video message directed to an individual. E-mail includes directed messages or any "always on" or other systems directed to a purchaser.

The term "Internet" shall include not only the present system of communication and electronic connection known as the Internet, and shall include not only that system know as the World Wide Web, but shall also include any other system connecting and communicating with an identifiable purchaser, including telephone, satellite communication, individualized radio transmission, and individualized cable television transmission.

The term "consumer information" shall include any information concerning a purchaser.

The term "direct marketing system" shall include the whole or any part of the system for communicating advertising, e-mail or other messages to the purchaser through an interactive device, regular mail, telephone, or other means.

The term "options display" is a Web page or other interface between the purchaser and the administrator where the purchaser inputs data, receives advertising and marketing, and makes selections.

The term "information" means any data concerning or identification of the purchaser, the source of the product being shipped, the product itself or the business or residential location of the purchaser.

Wherever the terms "his," "he" or "him" are used, it shall be deemed to include the female or gender neutral equivalent, and vice-versa.

The term "cross-selling" shall include the effort to sell any other item, product, or service to the purchaser picking up the product, whether or not the item, product or service actually relates to the product being shipped.

A "message" shall include any communication between the administrator, a retail outlet associated with product pick up, or other advertisements from any other source and the individual. These may include, but are not limited to, e-mail, advertising, video, coupons, promotions, or audio communication. In addition to advertising, the term message may include information or other communications such as welcome message, thank you message, or instructions.

The term "administrator" shall mean a third party responsible for providing relevant information to both the purchaser and the retailer or making arrangements between the purchaser and the retailer for product pick up or drop-off at the retail outlet, or arranging for product shipment by a carrier.

The term "reduced shipping cost" indicates the cost may be partially reduced or fully reduced such that the shipping cost to the purchaser is free.

The term "in-store credit" may take the form of a credit for any purchase in the retail outlet or the form of a coupon associated with a product in the retail outlet.

FIG. 1 illustrates a series of steps associated with the method in accordance with the first embodiment of the subject invention.

A purchaser of a product using the Internet, a telephone, electronic mail or mail order has a variety of options in which he or she may receive the product including direct delivery to the purchaser's home or pick up by the purchaser at a specified outlet.

The inventors have discovered that it is possible to influence the outlet selected by a purchaser at which he/she will pick up a product by identifying the benefits of certain outlets to the purchaser and permitting the purchaser to then select from among these outlets in light of the benefits provided.

As illustrated in FIG. 1, a supplier receives an order for a product from a purchaser 10. Shipping of the product must then be arranged. Among the information received from the purchaser is the purchaser's address or other information sufficient to get a general or specific idea of the purchaser's location. The administrator now knows at least the name and general location of the purchaser. In certain instances, the administrator may know additional information that may be useful in marketing, such as the purchaser's spending habits, income, street address, etc.

With this information, an administrator identifies a number of different remote locations 15. Each of these remote locations has previously provided information on which type of incentives they are willing to provide to induce a purchaser or class of purchasers to visit their outlet.

As an example, the owner of a newly opened store is motivated to provide incentives to potential customers to visit and become familiar with the new store. Therefore, such a store might provide discounts, store credits or other incentives to motivate a purchaser to visit their store.

Such benefits to the purchaser/visitor may include, but are not limited to:

1. reduced shipping cost;
2. in-store credit;
3. the opportunity for the purchaser to inspect the product before it is picked up;
4. the opportunity for the purchaser to delay payment until actually receiving the product;
5. the opportunity for the purchaser to withhold payment if the product is not acceptable;
6. the option for the purchaser to select an outlet at which to pick up the product;
7. the opportunity to select the most convenient remote location in which to pick up or return a product from among a plurality of outlets;
8. the opportunity to use a remote location for package pick up or delivery; and
9. the opportunity to receive reduced shipping cost of the product in exchange for a guaranteed purchase in the remote location.

While the benefits of reduced shipping costs and in-store credit will hereafter be discussed with reference to a suggested formula, it should be appreciated that the remaining benefits may or may not be made available based upon an evaluation of the same factors set forth in the formula.

Having identified the benefits considered to be important to purchasers, the administrator may now query each of a number of remote locations to see whether or not that remote location would be willing to provide all or some of these benefits to a purchaser or, in the alternative, provide additional different benefits to a purchaser to motivate him or her to visit their store 20.

The outlet may provide to the administrator a formula for establishing customized benefits to specific purchasers depending on the level of interest the outlet may have in attracting that type of purchaser or purchasers of specific product types into their outlet. Under these circumstances, once the administrator has this information, it would not be necessary to contact the outlet to determine benefits for each individual purchaser.

With a list of benefits attractive to one purchaser and a list of benefits which different remote locations are willing to provide, the administrator may now evaluate each remote location 25 and identify to the purchaser each of the outlets with their respective benefits and the level of correlation of these benefits to the benefits attractive to the purchaser 30. Thereafter, the purchaser is permitted to select an outlet best satisfying his or her needs 35.

The administrator may then arrange for pick up or return of a product at that elected outlet 40. In return for providing benefits to the purchaser, the remote location may receive one or more of the following benefits:

1. assurances that this specific purchaser will be visiting their outlet;
2. personal information on the purchaser and the product the purchaser intends to pick up or return;
3. direct marketing and advertising opportunities;
4. to a degree mutually agreed upon by the purchaser and the administrator, opportunities for the remote outlet to contact the purchaser, by e-mail or other advertising means, for marketing purposes;

5. the opportunity to cross-sell to the purchaser since the primary product has already been identified; and 6. a commitment on behalf of the purchaser to purchase in the outlet a minimum amount of merchandise to offset the benefit provided by the outlet to the purchaser. Such cost that might be associated with this program would include the setup and administrative costs of the outlet in making arrangements to act as a pick up/delivery center or the cost of shipping to a remote location.

For arranging this introduction and marriage between the purchaser and a specific outlet, the administrator would receive some sort of incentive. One such incentive would be a fee for each delivery or return by the purchaser at an outlet. For creating and/or carrying out the new direct marketing opportunities, the administrator would receive a fee from advertisers.

This method provides benefits to each of the parties involved. By utilizing this method, a retailer with "bricks and mortar" stores who has the desire to make the Internet a business builder has the opportunity to bring in e-commerce customers to their stores to pick up their Internet purchase. These are customers who normally may not visit the retailer's store or would not normally visit the retailer's store at that time and, as a result, this provides an opportunity where none previously existed. Additionally, this provides to the outlet in-store floor traffic from individuals picking up Internet-purchased shipments and the opportunity to build store loyalty and repeat visits with regular customers. With or without specific customer data, this provides the outlet with a highly targeted marketing opportunity for purchasers, whether regular customers or not. Such marketing may be through the administrator to the purchaser, or directly from the retailer to the purchaser.

On the other hand, it permits the purchaser to determine what benefits are most important to him or her in picking up the product and, as a result, select an outlet that satisfies all or most of those desired benefits. While at first inspection it seems the most important benefit for many purchasers may be convenience of location, when a number of stores are available and each store has a location that is as convenient or nearly as convenient as the other, then other factors, such as benefits a remote location can supply, play a dominant role. Furthermore, benefits may be sufficient to induce a purchaser to travel to a less convenient location for pick up or return of a product. Alternatively, a purchaser may elect to always pick up or drop off packages at a single retail outlet where the purchaser makes other regular purchases and which store may provide shipping cost reimbursement or other benefits as a reward to such a regular customer.

The method according to this invention may be particularly effective for purchasers for whom immediate delivery is not a priority. As an example, working singles and couples for who in-store pick up is more convenient and safe than a shipment dropped off at a residence may prefer such a service. For some individuals, the picking up or returning of a product at a remote location may even provide faster delivery than when a product is directly mailed to the purchaser's residence. This is especially true when a product must be personally delivered to the purchaser and the purchaser is not available at the selected delivery times. Large corporations such as J. C. Penney's currently permit catalog pick up at their subsidiary, Eckerd Drug Stores. However, the primary selection a purchaser has is which of those Eckerd stores is most convenient. Moreover, at these stores, the purchaser may receive only a monetary discount associated with the reduction in shipping costs for shipping to a business as opposed to a residence.

The subject invention, on the other hand, provides incentives to purchasers beyond the actual reduction in shipping costs between a business and a residence. The subject invention also offers other benefits including, but not limited to, permitting the remote outlet to market other related or unrelated products to the purchaser prior to, or at the time of, visiting the remote location. These additional benefits can be provided by the outlet and, as a result, the outlet may influence a purchaser to pick up a product at one outlet over another outlet. Investing money in such a method may be more effective than money invested in other forms of advertising since now the outlet will be able to direct advertising directly to the purchaser. The outlet is guaranteed a visit by a purchaser and the outlet has information about the purchaser they may use to influence a purchase at the outlet store by the purchaser. The ability to market to a purchaser guaranteed to come into the store is unique to this system.

Additionally, this provides an ideal opportunity for cross-selling products. Cross-selling is the activity of promoting a product or service that, when combined with the primary product, makes a better or complete solution. Cross-selling also includes the activity of promoting any product or service that the remote outlet, based upon the purchaser's characteristics and purchased products, believes the purchaser may be enticed to purchase.

While any marketing may be directed to the purchaser, it should be appreciated that communication to the purchaser may also be viewed by others in the purchaser's family or household, others sharing an Internet address or others sharing the same individual cable television address.

So far, the discussion has been directed to outlets in general, without distinguishing between them. An outlet, in one arrangement, could be a store that provides products completely different from the product (primary product) to be picked up by the purchaser. However, this is not the only criterion that may be used.

It is entirely possible for the purchaser to pick up a product at a location that sells that same product or competing products. The outlet has already lost the sale of that primary product to the purchaser and, as a result, has only to gain by the purchaser visiting the outlet. However, such a determination will be made by the outlet and it is entirely possible that an outlet carrying competing products may not wish to induce this purchaser to visit.

This method can also benefit advertisers unrelated to the retail outlet by giving them the opportunity to provide direct marketing to individuals who will be traveling in a known geographic area. For example, an advertiser may be located near the retail outlet. It also affords advertising by manufacturers of products sold in the retail outlet who for the first time will be able to market to a class of customers known to be coming into the retail outlet. Knowing future events will make this form of advertising particularly beneficial.

Figure 2:
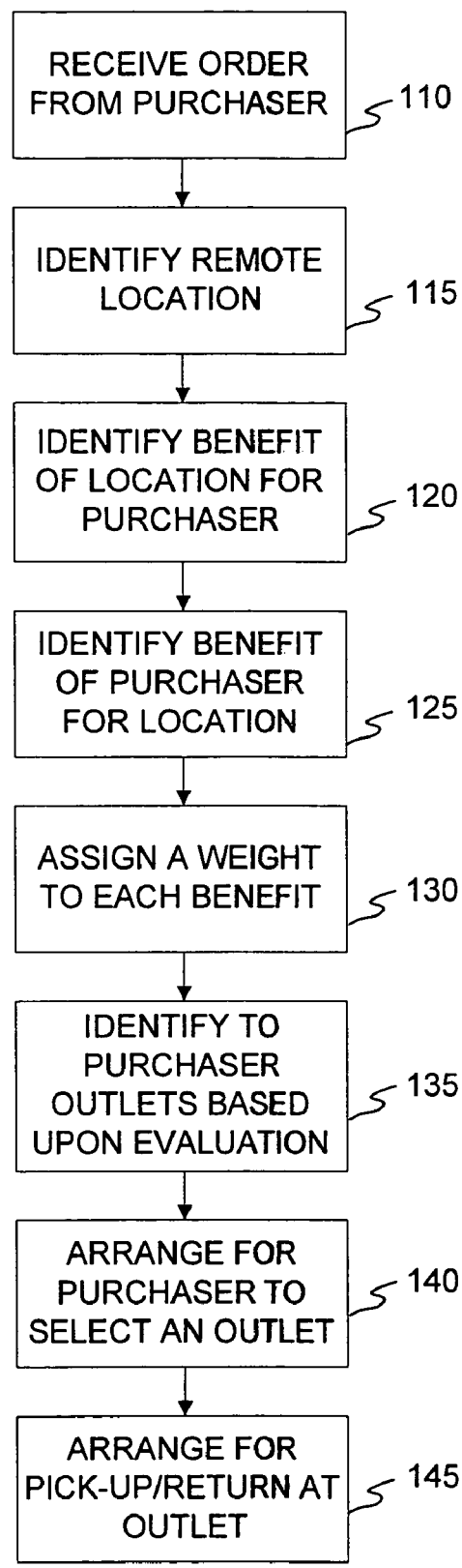
FIG. 2 is a flow chart illustrating another embodiment of the subject invention whereby the retail outlet is suggested to the purchaser.

The flow chart in FIG. 2 illustrates a second embodiment of the subject invention. Just as before, after a supplier receives an order from a purchaser 110, the administrator identifies a number of remote locations as the potential outlet for the purchaser 115.

Once again, for each location, the benefits to the purchaser are identified 120. However, a similar query is made of the remote locations that may act as outlets for the administrator to determine the benefits the outlet may receive from the visit by that purchaser picking up the product at their location 125.

Each remote location may provide to the administrator weighing criteria for each of many variables associated with, but not limited to, the value of attracting and marketing to such a purchaser. At that time, the administrator may assign a weight to the benefits sought by the purchaser and the benefits sought by the outlets 130. Using predetermined logic, such as that existing in a mathematical algorithm, one or more outlets may be selectively identified to the purchaser based upon the evaluation of these weights 135.

Using this method, it is possible for an outlet to be strongly suggested to a purchaser based upon not just the benefits received by the purchaser, but also the benefits received by the outlet. At that point, arrangements will be made for the purchaser to select an identified outlet 140, however, this selection will be presented to the purchaser in a manner influenced by these weighing criteria.

Thereafter, arrangements will be made for the purchaser to pick up or return the product at the selected outlet 145. The mathematical algorithm for storage and processing of data for this method is preferably performed utilizing software in which data will be entered and analyzed to produce a list of recommended outlets.

It should be appreciated that any number of factors may be evaluated by an outlet to determine the benefit that outlet is willing to provide to the purchaser. These factors include, but are not limited to:

1. the location of the purchaser;
2. the location of the participating outlet;
3. the type and size of product being purchased and shipped;
4. the actual shipping cost;
5. the shipping cost which the purchaser would have or might have incurred to have the product shipped directly to the purchaser's home or business;
6. the approximate time of pick up;
7. the purchasing history and other background of the purchaser; and
8. the identity of the supplier of the product being purchased and shipped.

In the alternative, it should be appreciated that any number of benefits may be evaluated by the purchaser to determine the benefit the purchaser will receive. These benefits include, but are not limited to:

1. free shipping or the exact amount of in-store purchase in lieu of payment for shipping;
2. partially free shipping;
3. in-store credits or discounts;
4. free or partially free escrow and inspection;
5. product return services;
6. location of the outlet;
7. location of the package pick up site within the outlet; and
8. the experience of the purchaser and the experiences of other purchasers (which may be summarized in a rating system) with a particular outlet as a package pick up site.

To assist the purchaser in selecting an outlet, data may be presented in an organized manner. An individual purchaser will be able to sort and display available outlets graphically and in tabular form, such as on a computer screen, by location, distance, amount of in-store credits offered, discounted shipping, type of store, experience ratings, and other combinations of criteria and benefits. It should be appreciated that shipping may be completely discounted such that it is free. Furthermore, in-store credits may be in the form of product coupons for use in the retail outlet.

As discussed, it is entirely possible for an outlet to provide to the administrator a weighing criteria. Such a weighing criteria may be applicable to each of a number of variables including, but not limited to, the desire to attract a purchaser from outside of the normal drawing area for that outlet, the desire to attract a purchaser of such a primary product, or the desire to attract such a purchaser for any number of different reasons. As a result, the benefits provided to the purchaser by an outlet may be entirely dependent upon the desire of that outlet to draw the purchaser into their store. Therefore, one purchaser may receive completely different benefits than another visitor for visiting the same store. Using such a purchaser sensitive arrangement, it is possible to customize benefit packages to each purchaser to reflect the outlet's desire to have that purchaser visit their store.

In one embodiment of the subject invention, for each pick up transaction the administrator may calculate using a formula a unique incentive based upon weighing factors supplied by the participating retailers. One incentive may be the offer of reduced shipping cost, paid for by the participating retailer in exchange for an in-store purchase. In the event that other incentives are offered, adjustments can be made to the formula.

The six variables in this formula are: (i) purchaser name, (ii) product, (iii) store location, (iv) purchaser location, (v) time, and (vi) supplier identity. These are called the Transaction Variables.

The purchaser's name will be provided to the retail outlet. This variable will allow the retailer to match the purchaser with the retailer's own database of purchasers. Some retailers may choose a lesser incentive for existing purchasers on the theory that they need not make a special effort to attract that purchaser. Others will see not only the benefit of rewarding their loyal purchasers, but more importantly, the benefit of combining their existing database of purchaser specific data with the data provided by the administrator to direct market that purchaser when they know he is coming into the store, and his purpose. Of course, if a purchaser develops a history of only coming to a store when picking up a package, and then only purchasing low margin or loss leader products, the retailer will be able to identify that purchaser and reduce the incentive offered to him by adjusting the purchaser variable.

The product will be identified generally by auction sites where the category can be uploaded, and very precisely by large retailers which can provide a link to an exact product code. Individuals and cottage industries not selling through an auction site will be asked to categorize their product in a manner similar to auction sites.

Product identification will be used in two ways.

First, product identification will be used as a weighing factor as one of the Transaction Variables. Participating retailers will find that it is more desirable to attract purchasers of certain products to their particular stores. Conversely, some stores may want to reduce or eliminate incentives to purchasers purchasing products which compete with the store's own merchandise. In such a case, the store may be given an option of not participating as a package site for that product.

Secondly, product identification will be used by the participating retailer to identify cross selling products for promotion to the purchaser. This activity is unrelated to the formula.

Store Location will provide a variable for adjusting incentives based upon individual stores. Therefore, a new store, or a store in a market share battle with a new competitor, may be identified as offering greater incentives. On the contrary, a store which is maximizing its potential may be identified for less than the company wide norm of incentives.

Purchaser Location will be used by participating retailers in conjunction with individual store location. For example, the participating retailer may choose to offer increased incentives if the purchaser's home is located in a different zip code or more than "x" miles from a particular store. The system will permit retailers to choose specific zip codes for greater, or lesser, incentives.

Time is not expected to be a significant factor. However this variable will allow a participating retailer to adjust its level of benefits based on the season. For example, for packages to be picked up during the back to school season, an office supply store might offer additional incentives. The system will allow that office supply store to offer such additional incentives only to internet purchasers of toys, or only to those who have frequently had toys delivered through the system.

The identity of the supplier may be required by some participating retailers so that they can "lock out" participation as a package pick up or return site for products from competitors.

Because of the great number of variations which can occur with a number of product categories, a large number of stores, and a large number of purchaser location possibilities, it is anticipated that each participating retailer will have a company wide set of basic criteria and only occasionally make changes for particular stores. The system will allow each participating retailer to authorize its store manager to make changes to the variable weightings for their store. Password IDs will be issued and companies will be able to establish parameters of discretion for the store manager.

One formula for the amount of in-store purchase required for free shipping is as follows (without an upper limit expressed):

Shipping Cost÷(Transaction Variables*Cap. Rate)
=In-Store Purchase where the Transaction Variables are the Purchaser Name, Product, Store Location, Purchaser Location, Time and Supplier Identity. When all Transaction Variables are set to 1, the normal capitalization rate will be used to calculate the in-store purchase required. The Transaction Variables, set at their neutral setting of 1 are:

(Purchaser Name=1)*(Product=1)*(Store Location=1)*(Purchaser Location=1)* (Time=1)*(Supplier Identity=1)

If a discount store such as K-Mart were to choose a base capitalization rate of 10%, and the shipping cost was $3.00 for a particular transaction, and the Transaction Variables all were neutral, then the in-store purchase required for free shipping would be $30.00 calculated as follows:

$3.00÷((1*1*1*1*1)* 0.1)=$30.00

However, if a discounter preferred purchasers purchasing toys and thus rated this product category at 150%, and rated a purchaser outside its zip code at 150%, the in-store purchase required for free shipping would be $13.33 calculated as follows:

$3.00 ((1*1.50*1*1.50*1*1)*0.1)=$13.33

In this example, the resulting capitalization rate is 22.5%, which might be a closer approximation of the discount store's gross margin.

If any of the Transaction Variables were zero, then an in-store purchase for free shipping would not be offered for that particular class of transaction. The formula will allow the retailer to set an upper limit on the capitalization rate so that a too favorable combination of factors cannot cause too small of an in-store purchase for a given shipping expense.

Free shipping in exchange for an in-store purchase may be a unique and powerful method for building floor traffic, which does not have to cost the retailer anything. The amount of the purchase required will be dependent upon the five Transaction Variables as well as the capitalization rate.

Retailers may select a high capitalization rate in order to attract traffic. In-store purchases may be viewed not as sales upon which profit needs to be earned, but rather the sale of some product at cost in order to attract a purchaser for other profitable sales. In this sense, the administrator will market the free shipping alternative to the participating retailers as a "break even leader" as opposed to the "loss leaders" with which the retailers are already familiar. Thus, the capitalization rate should be set at the gross margin for the store.

Retailers may initially desire to price incentives based upon their operating margin, or even net profit margin. This is because the formulas are based upon margins, and the natural tendency of the retailer is to begin with its lowest margin in order to ensure that all of its costs are covered. The administrator will maintain that the proper percentage should be the store's gross margin, or a figure near it.

When a retailer currently offers a low margin or loss leader promotion through traditional advertising, such as newspaper coupons, it considers only the cost of the product, not the firm's operating expenses as well. If, for example, the retailer offers a tube of Crest toothpaste which costs $1.00 for 95¢, then the retailer typically views this as a 5¢ expense. The retailer does not view this as a, say 15¢ expense by also including operating expenses. In other words, promotional products are generally viewed at their inventory cost. Since the formulas cannot know the actual products which the purchaser will purchase as their in-store purchase, the analogous figure for the formula is the retailer's gross margin. As used in the system, the gross margin will, on average, produce a sale of in-store products such that after deducting for the cost of the shipping, the in-store products were sold at inventory cost, similar to other incentive programs.

A retailer's gross margin is an average and the purchaser can select low margin merchandise for his in-store purchase. Recognizing that many stores may not wish to set the capitalization rate at their gross margin level, the system will encourage participating retailers to set a normal or basic capitalization rate as high as possible. One suggestion is to set the capitalization rate at the company's operating margin, and allow the incentives formula to increase that rate up to the gross margin, or a set point beyond that if acceptable to the retailer. The example does this if the retailer's operating margin is 10% and gross margin is 22.5%.

The formula will permit the product of the Transaction Variables to be restricted to a maximum amount. For example, if the Transaction Variables product was limited to 2, then the capitalization rate could never be more than twice the firm's nominal rate. Thus, if a firm's gross margin was 20% and operating margin was 10%, the firm might choose to set the nominal capitalization rate at 10% and permit attractive Transaction Variables to increase that figure up to 20%. The limit could also be a higher number, say 2.1 in the foregoing example, to permit a certain amount of "loss leaders" to be offered. Conversely, firms could set the nominal rate at their gross margin, with a cap at that figure, and use the Transaction Variables to reduce that figure.

An additional incentive for a purchaser to choose a retail outlet for package pick up could be an in-store credit or a payment to the purchaser to attract him to the store. Since the retailer would only pay if the offer were accepted, some retailers might desire such an incentive system.

In accordance with another embodiment of the subject invention, an in-store credit may be considered in conjunction with or as an alternative to reduce shipping costs.

In its simplest implementation the in-store credit would be the amount, on a company wide basis, which the retailer is willing to spend to bring people in the door. Retailers know this figure from their existing promotion experience. At the next level, the in-store credit would be the amount which the retailer is willing to spend to both bring people in the door and create the unique advance direct marketing opportunities.

For example, when opening a new store, the retailer may wish to give a substantial in-store credit to any purchaser in the general area. For a more established store, the retailer may offer a low in-store credit to purchasers from the immediate area, but a high in-store credit to purchasers on the fringe of a particular store's market area. Those customers may regularly shop at a competitor's closer store. That competitor may also be a participating retailer. That competitor may also minimize the in-store credit and other incentives to its near-by customer. Now the Purchaser will have a choice: pick up nearby for a smaller incentive, or try the more distant store for a greater incentive. The scale may be tipped in favor of the retailer that knows best how to use the product and consumer information, and whether or not it will produce profitable cross selling opportunities. Retailers will be able to do all of this using a formula to calculate the credit.

The retailer would appreciate the fact that the in-store credit does not have to be offered equally to all prospects. Thus, since the in-store credit is not wasted on a purchaser who is not likely to be profitable, or on a store that does not need promotions for success, the marketing expense can be saved and instead used to increase the offered in-store credit where it can do the most good.

In order to enhance use of free shipping with an in-store purchase, the purchaser may be required to choose either the in-store credit or free shipping, but not both. However, if free shipping for an in-store purchase is not applicable due to seller paid shipping, the in-store credit would be an even more important incentive.

One formula for the in-store credit could be similar to the one used to determine the amount of in-store purchase for free shipping.

Each participating retailer would select a basic, or normal amount of store credit to attract purchaser traffic and create the direct marketing opportunities. The formula for in-store credit could be:

Transaction Variables*Normal Credit=Credit Offered where the Transaction Variables, set at their neutral setting of 1 are:

(Purchaser Name=1)*(Product=1)*(Store Location=1)*(Purchaser Location=1)* (Time=1)*(Supplier Identity=1)

Such that if the Normal Credit =50¢ then:

$[(UN=1)*(Pr=1)*(SL=1)*(UL=1)*(T=1)]*(SI=1)*$ (Normal Credit=50¢)=50¢

Each participating retailer will then be able to input its own company wide and store specific criteria for the four variables. For example, discounters may prefer purchasers who are purchasing toys and thus rate this product category at 150%, and rate purchasers outside its store's zip code at 125%, in which case the formula would determine an in-store credit as follows:

$[(UN=1)*(Pr=1.50)*(SL=1)*(UL=1.25)*(T=1)*(SI=1)]* (50¢)=94¢$ which could be rounded to the nearest 10¢, or 90¢.

If both the Internet product type and the Purchaser's location warranted a 150% rating then the formula would be as follows:

$[(UN=1)*(Pr=1.50)*(SL=1)*(UL=1.50)*(T=1)*(SI=1)]*(50¢)=\$1.125.$

Rounded to the nearest 10¢ this would give a WTS in-store credit of: $1.10.

Of course, by entering a zero in any variable the company will eliminate any in-store credit. Thus, for a store which was undergoing management difficulties the "SL" factor for that store may be temporarily set at zero.

As well as a method of inducing a purchaser to visit a store, the subject invention is directed to a method of delivering a purchaser to a retail outlet and providing the retailer with a unique, direct marketing system which is directed to that purchaser prior to his/her store visit and during the store visit.

Specifically, the retailer may attract a purchaser to the retail outlet by arranging shipping of a product purchased by that individual to a certain retail outlet. As an example, the product may originate from a seller which is the same as, or related to, the retail outlet or from a seller completely unrelated to the retail outlet.

The outlet may be selected by the purchaser from a list of participating retail outlets or may be recommended by the administrator or recommended by the seller of the product being shipped. Details of this arrangement have been previously discussed. At the retail outlet, the product will either be held in storage by store personnel or held in a product pick up box. To induce the retail outlet to receive product for pick up by purchasers, the retail outlet is entitled to directly advertise and to send e-mail to the purchaser who is known to be coming into the retail outlet within a defined time frame. The purchaser is known to be coming to the retail outlet because the administrator has arranged for the purchaser's product to be delivered to that retail outlet. The time frame within which the purchaser will be coming into the retail outlet is defined by the date shipping is arranged, the date the item is actually shipped by the seller, the speed of delivery selected, and the time period within which products are required to be picked up at the retail outlet after delivery. The actual time frame for product pick up will be much narrower, on average, as most purchasers will pick up packages shortly after delivery to the retail outlet, rather than wait until the end of the required product pick up period.

The combination of arranging for shipping to a retail outlet and the administrator's Internet, or other interactive device, connection with the purchaser creates a unique marketing product of floor traffic generation which is guaranteed to occur and creates a unique result of a direct marketing system to a purchaser known to be coming into the retail outlet. When information concerning the purchaser's Internet product purchased, the retail outlet from which it is purchased, and the purchaser's name and/or address is added to a database, the administrator then creates a unique collection of purchaser information concerning a purchaser who is known to be coming into the retail outlet within a defined time frame, and the further unique result of a direct marketing system to such a purchaser and forwards select information to the retail outlet. The retail outlet now may initiate direct marketing to the purchaser.

The combination of the floor traffic generation, advertising, customer information, and direct marketing, which are all directed to or concerning a specific purchaser known to be coming to the retail outlet within a defined time frame, constitutes one aspect of the subject invention.

In addition to payment and address information acquired in any shipping transaction, the purchaser using the administrator to arrange shipping will also need to select a product pick up site. That purchaser will want to view the menu of benefits available to him/her.

Figure 3:
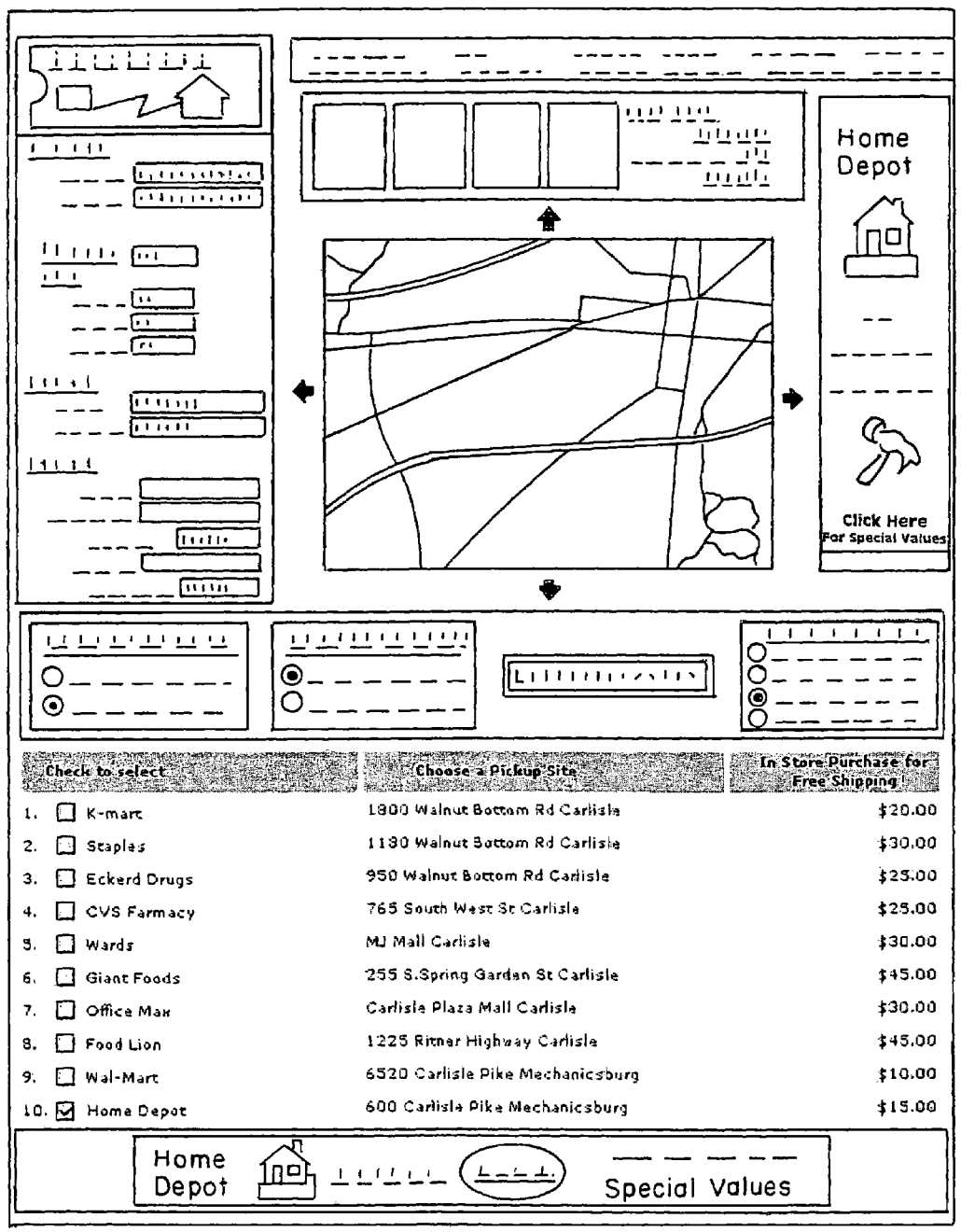
FIG. 3 is a schematic of a sample screen output that may be used by the purchaser to select a retail outlet and also be used for direct marketing to the purchaser.

A representation of the options display, which a purchaser might view, is attached as FIG. 3. This representation assumes a purchaser transaction such as, for example, an eBay auction where the purchaser is paying for shipping. FIG. 3 also shows the purchaser's options for in-store purchase in exchange for free shipping. If the purchaser were arranging shipping of a product purchased from a seller who provided free shipping using a slower ground delivery service, then "seller paid" will be displayed where the price for that level of shipping would have been and the "in-store purchase for free shipping!" would be replaced by, for example, "in-store purchase for two-day shipping!"

FIG. 3 also provides an example of the advertising which the purchaser will receive during the selection of a retail outlet for product pick up. The purchaser will be able to experiment with the selection of different retailers to see the benefits and promotions offered by each. Some advertisements may be dependent upon purchaser selection of different retailers for product pick up. Some advertisements may cycle through various messages from the group of retailers offering their retail outlet as a product pick up site to this particular purchaser for this particular shipping transaction. Some advertisements will be general advertisements not necessarily related to any participating retail outlet.

When the purchaser confirms a selection of shipping arranged by the administrator and, furthermore, has selected a retail outlet for product pick up, then the displayed Web pages will all include both general advertisements and/or retail advertisements for the retail outlet where the package will be picked up.

At the "click here for special values" location of the advertisements for the retail outlet holding the product, the individual may be directed to:
1. a separate Web page for that participating retailer which is located at the Web site of the administrator;
2. a separate Web page for that particular retailer which is located on the participating retailer's Web site; or
3. another location on that particular Web page.

After selecting "click here for special values", the purchaser may be given general or specific advertising or promotions from the retailer or general or specific manufacturers' promotions given in conjunction with the retailer, or general or specific advertising independent of the retailer.

In a preferred embodiment, the information concerning the purchaser and his product for pick up will be matched with the retailer or third party data on likely cross-selling opportunities for products carried by the retail outlet plus any general or specifically created promotions available from the retailer or different product manufacturers to provide a specific set of advertisements and promotions for this specific transaction. In such a preferred embodiment, the specific set of advertisements and promotions for this transaction may be located on an individual Web page created just for that transaction. The goal of this type of advertising or e-mail may be to encourage the purchaser to view that individual Web page.

For example, the purchaser receiving the Nikon AF lens in FIG. 3 might, if selecting a general merchandise retailer such as K-Mart for product pick up, receive a general advertisement for film and developing, a promotion for production of enlargements from a provider such as Kodak offering its services through K-Mart, a promotion for picture frames from a manufacturer selling through K-Mart, a promotion for camera bags from K-Mart independent of any manufacturers' participation, as well as general advertising and promotions offered at that time at that specific retail outlet, or unrelated to that specific retail outlet.

Directing e-mail to the purchaser can occur at the moment shipping is arranged, when the administrator receives notification that the product has been shipped and is in the hands of a carrier, when the administrator receives notification that the product is delivered to a retail outlet, at any additional times between such shipping arrangement and delivery of the product to the retail outlet, and at any time after delivery of the product to the retail outlet.

The content of the direct e-mail may be the same advertisements and promotions as those described above, or a different set of advertisement and promotions, or directions to a specifically created Web page for this transaction which would display those advertisements and promotions.

Although the administrator could release the physical address or e-mail address of the purchaser to the retail outlet, in the preferred embodiment, the physical address and e-mail address will not be released. Furthermore, the administrator will provide a marketing opportunity to the retail outlet associated with the product only during the shipping, delivery and product pick up experience. Thereafter, such advertising or e-mail will be provided only on a limited number of occasions. The purchaser is less likely to receive a continuing and uncontrolled volume of direct mail or direct e-mail and thus is more likely to use the system in accordance with the subject invention. All messages from the retail outlet associated with the product to the purchaser will be sent to the administrator with an identification for this transaction or class of transactions, and then sent to the purchaser by the administrator. Such messages may stand alone or may be combined with other administrator messages concerning shipment, transit status or delivery.

It should be noted that many other channels of communication with the purchaser beyond e-mail are available and may be used.

The e-mail from the retailer associated with the product passing through the administrator is uniquely valuable to the retailer. When this e-mail is sent prior to product pick up, it is directed to a purchaser who is looking forward to receiving it. Unlike other sources of direct mail marketing, here the purchaser has not only an interest in receiving e-mail concerning the status of a shipment, but a need to receive the e-mail indicating that the product is delivered and ready for pick up by him/her. In addition, whether or not the e-mail message is related to shipping status, the direct e-mail is uniquely valuable to the retailer as it is directed to a purchaser who is known to be coming into the retailer's store within a defined time frame and who has selected the retailer for package pick up.

When the purchaser picks up the product, a printout of advertising and promotions will be generated and delivered to him/her. Such printouts may be generated prior to package pick up. In addition, video and/or audio messages will be displayed before and after product receipt.

After product pick up, the retailer advertising and promotions will be included in a combined administrator and retailer message thanking the purchaser for using the system.

Advertising and e-mail messages may also be directed to the purchaser during the purchaser's Internet, or other interactive, connections which are unrelated to the shipping transaction, and beyond e-mail as it is commonly now used. This may be made by means of identifiers, such as "cookie" technology, located in the purchaser's computer, interactive television, wireless device, or other interactive device which identifies the purchaser.

In such instances, the administrator will direct advertising from the retail outlet associated with the product pick up, and from other advertisers to the purchaser during the purchaser's other usage of his Internet connection.

Examples of this advertising are:
1. audio advertisements when using an Internet connection for radio reception or downloading music;
2. video advertising as a part of movie reception over the Internet;
3. video advertising in conjunction with reception of commercial television over the Internet or by means of a cable television system where reception may be individualized;
4. text, audio or video advertising when a purchaser accesses the Internet by means of a hand-held Internet telephone or other device;
5. text, audio or video marketing provided through an "always on" Internet connection such as a cable or modem or dedicated line or service; and
6. advertisements provided through any interactive television or communications medium where the purchasers' identity is known.

In an alternative embodiment, the administrator will preserve the anonymity of the purchaser. The administrator will not release to the retailer, or others, the name or any other data about the individual or, alternatively, will only release general information concerning the zip code location and type of product to be delivered. The administrator will then match the identity of the purchaser to predefined advertising and promotions from the retailer or other advertisers and create and send individualized advertisements and e-mail. An example is a further refinement of the example previously described in this section. That example concerned the advertising a purchaser might receive when picking up a Nikon AF lens. In this expansion of that example, the retailer and service and product suppliers may set criteria and provide marketing material for advertising to all purchasers arranging shipping of photographic equipment. The administrator would match this criteria and merge the material into individualized advertising or e-mail, including references to the purchaser by name, and the utility of the advertised products when combined with, or related to, the products to be delivered and picked up. Such advertising may be provided to the individual by, for example, any of the methods described in the preceding paragraph.

The subject invention is equally applicable to small sellers or individual shippers who may come to a retail outlet to drop off a product for a shipment. In that case, the subject invention is similar except it is in anticipation of a visit to a retail outlet for package drop-off. In that instance, the seller or individual shipper is not anticipating e-mail, however, it may be marketed in all the same ways. The administrator will have all of the same information concerning the seller or individual shipper as it would have information on the purchaser receiving a product including identification of the contents of the product to be shipped.

One unique element of the subject invention is the creation of a relationship between the purchaser and a retailer where the retailer knows that the purchaser will be coming to a specific retail outlet within a defined time frame. The administrator knows the identity and e-mail and/or Internet connection address of the purchaser and is able to create an individualized direct marketing relationship based upon this knowledge. Such a marketing effort may be for the benefit of the retailer, or any others. Additionally, as a result of information available from the shipping and product pick up experience, an integrated marketing effort may be compiled for a purchaser who is known to be coming into a specific retail outlet.

As a further inducement for a retail outlet to accept and hold a package from a remote location, for later pick up by a purchaser, the purchaser may exchange personal information for free or reduced cost shipping and/or the ability to use a particular outlet as a package pick up site. The purchaser may provide personal financial, demographic, family, and/or purchasing information in exchange for free or reduced cost shipping of a package. The free or reduced cost shipping may be transaction based, or based upon a credit to be used against multiple shipping transactions. The information may be made available to any interested party, a limited number of parties, the supplier and outlet only, or any one party only. The availability of such information may or may not be limited in time. The amount of benefits available to the purchaser may be dependent upon the amount of information provided and the extent of its availability to interested parties.

A further refinement may involve free or reduced cost shipping, or the exchange of participation of a particular retail outlet as a package pick up site, as described above, in exchange for an agreement to allow the administrator or a third party to track and have information on the purchaser's Internet, television, or other medium, viewing or purchasing experiences. Such information may be obtained, for example, by an agreement to allow "cookie technology" in the individual's computer or other communications device. The benefits available to the purchaser may vary depending upon whether the information provided is made available to others with attribution to the individual, or only made available on a non-attribution basis, when aggregated with data from other individuals.

Finally, the administrator may have significant information about a particular purchaser and may further utilize such information. In particular, the administrator will know where the purchaser lives and approximately when the purchaser will travel to pick up a product at a retail outlet. This information may be of interest to stores or merchants along or near the route the purchaser may travel to the retail outlet for the product pick up. Therefore, these stores and merchants may have an interest in direct marketing to this purchaser. This may be of value to both the administrator and any of a number of stores or merchants. Such direct marketing may include e-mail or advertising to the purchaser before, during or after traveling to the retail outlet for product pick up.

Additionally, the administrator has the identity of the purchaser and at least the location of the retail outlet along with the approximate time the purchaser will travel to the retail outlet to pick up the product.

Information about the identity of a purchaser when such a purchaser plans to visit a retail outlet and what that purchaser intends to pick up, along with other information, provides to the administrator and the retailer a very powerful tool for customized advertising for a known purchaser with a known product interest. As a result, the system disclosed herein provides a unique marketing tool to the retailer to present focused advertising to the purchaser before, during and after visiting a retail outlet to pick up a product. The administrator may also benefit from such information by directing to the purchaser e-mail or advertisements from other sellers that may be interested in attracting a particular purchaser to their stores.

The invention also benefits the internet, catalogue, or other seller of the product being shipped by lowering shipping costs and creating the economic incentives necessary for physical retailers to participate as package pick up and drop-off sites.

Summarizing, the subject invention provides a method of connecting marketing messages to the purchaser prior to, at the time of, or after product pick up. Marketing messages may be sent to the purchaser using any number of methods including, but not limited to, e-mail, telephone, Internet connection, or individual cable television addresses. Such marketing messages may be sent directly, or through the administrator, from the retailer to the purchaser. Such advertising is a unique form of direct marketing as it combines the purchaser profile described above with the package pick up and because:
  a. marketing is directed to a purchaser who is known to be coming into the store;
  b. the purchaser has chosen the remote location for package pick up;
  c. the time frame within which the customer will come into the store is known;
  d. advertising and direct e-mail can be timed to arrive just before the purchaser comes into the store;
  e. the package pick up experience creates a relationship between the purchaser and the store;
  f. the purchaser wants and needs to receive administrator notices regarding shipping status and delivery, to which can be attached marketing;
  g. the administrator knows who the customer is;
  h. the administrator knows the location of the customer;
  i. the administrator knows what the customer is coming to the store to pick up;
  j. the administrator knows the entity which is shipping the package to the customer.

The administrator may direct to the purchaser e-mail or advertising from sources unrelated to the remote location based upon the purchaser profile described above including, but not limited to, the type of product, the type of store from which the product was purchased, the type and location of store from which the product will be picked up, and the name and location of the purchaser.

The information available to the administrator relating to the purchaser enables unique marketing opportunities for direct marketing from the retailer, or the administrator, or others, to the purchaser since the administrator knows the identity of the purchaser and knows when he/she will be traveling to a certain retail outlet to pick up or drop off a product. The retailer, or other advertisers, may have access to some or all of this information.

Figure 4:
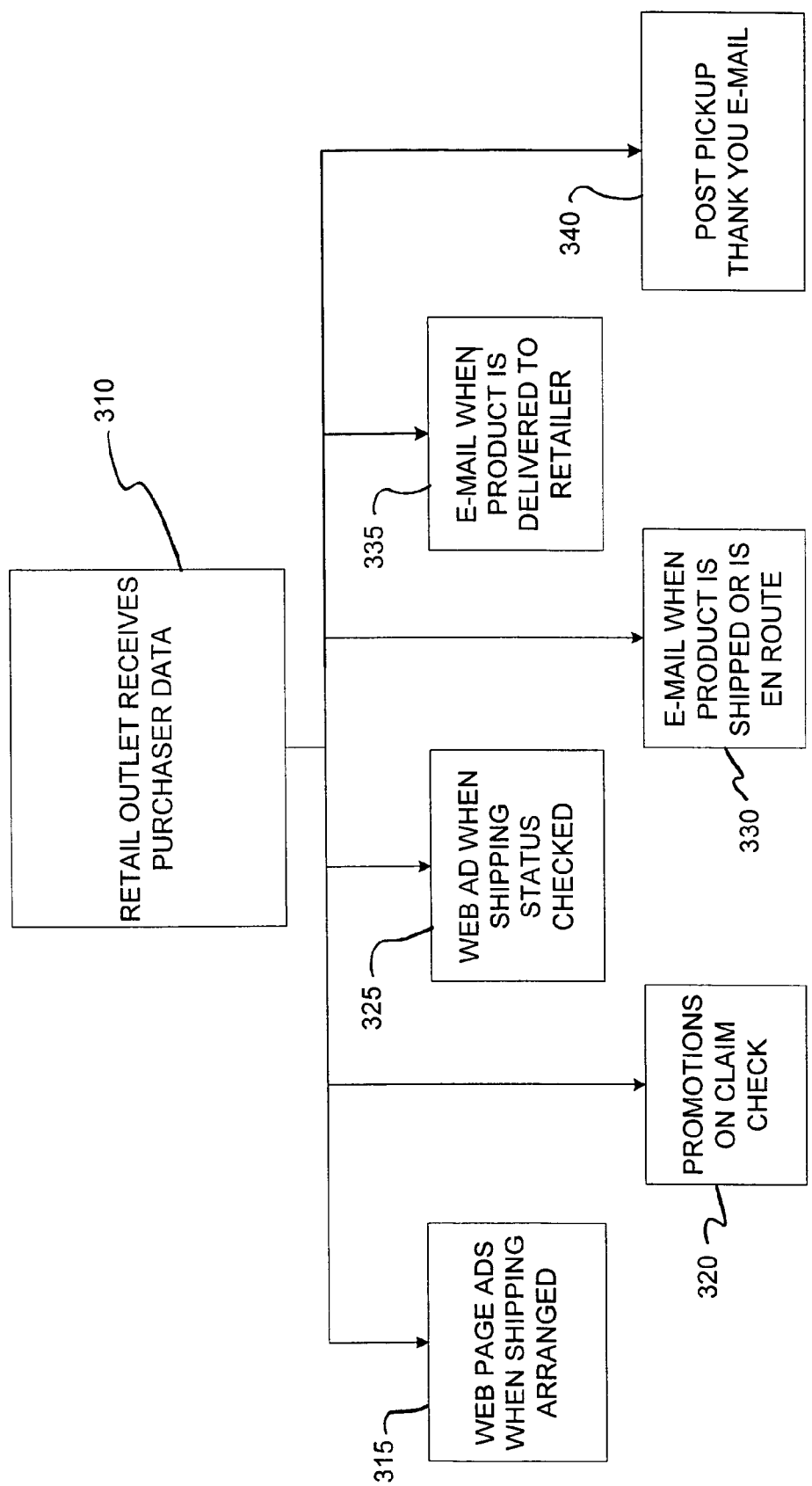
FIG. 4 is a flow chart illustrating yet another embodiment of the subject invention whereby the retail outlet is provided with the opportunity to direct market to the purchaser.

FIG. 4 is a flow chart illustrating different aspects of direct marketing in which a retail outlet may participate upon receiving data about an upcoming visit by a purchaser 310. Under one possible scenario, a web page ad may be forwarded to the purchaser at the time shipping is arranged 315. Furthermore, a promotion may be included on a claim check 320 the purchaser would use to pick up or drop off a product. Additionally, another web ad may be generated when, and if, the purchaser checks the status of shipping 325. Additionally, an e-mail ad may be sent to the purchaser along with a notice that the product has been shipped or is en route 330 or at the time the product is delivered to the retail outlet 335. Finally, an e-mail ad may be sent to the purchaser after the product is picked up or dropped off by the purchaser 340.

When the retailer knows a customer will be visiting his/her store within a given time frame to pick up a package, the retailer now has a valuable opportunity to very efficiently focus a marketing effort at an individual known to be visiting the store. This may result not only in additional store purchases by the customer during the visit for package pick up but may result in additional subsequent customer visits and purchases at the retail outlet. Over time, valuable customer loyalty may be developed.

While the mere fact a customer is known to be visiting a retail outlet is sufficient for some level of marketing, at least minimum information about the customer is needed for more focused marketing efforts. As an example, the customer name would, in most cases, provide to the retail outlet - or the administrator - the opportunity to correlate census information for more details about the customer and, as a result, permit the retail outlet an opportunity for more pointed marketing directed at the customer.

Therefore, direct marketing may be tied into a known future event, which would be the visit of a purchaser to an exact retail outlet and the time frame within which such a visit will occur.

It should be appreciated there is value in direct marketing to a purchaser known to be en route to a retail outlet and this value may be appreciated by an unrelated outlet the purchaser may be near en route to the retail outlet. Therefore, as another embodiment of the subject invention, the method of direct marketing discussed herein may also be made available to this unrelated outlet.

The invention has been described with reference to the preferred embodiments. Obvious modifications and alterations will occur to others upon reading and understanding the preceding detailed description. It is intended that the invention be construed as including all such modifications and alterations insofar as they come within the scope of appended claims or the equivalents thereof.

We claim:

1. A computer-implemented method of inducing a purchaser to visit a retail outlet at a remote location upon the purchase of a product from a supplier to pick up the product, the method comprising the steps of:
  a) identifying to the purchaser, through a computer, at least one benefit to the purchaser offered by each of at least two retail outlets to induce the purchaser to visit one of those retail outlets, wherein the at least one benefit from each of the retail outlets is customized based upon information about the purchaser provided prior to pick up of the product, wherein the at least one benefit to the purchaser is one from the group consisting of a reduction in shipping cost for the product, in-store credit provided by the retail outlet and discount coupons provided by the retail outlet, wherein the product must be shipped pursuant to a purchase by the purchaser and wherein the product is supplied from a supplier unrelated by ownership to the retail outlet, and b) accepting from the purchaser a selection of one of those retail outlets for product pickup based upon the customized benefits offered by the retail outlet to that purchaser.

2. The method according to claim 1 wherein the reduction in shipping costs is based upon marketing variables comprised of at least one from the group of purchaser name, product purchased, store location, purchaser location, time of product pick up, identity of supplier and history of purchaser's buying in similar prior transactions.

3. The method according to claim 1 wherein the reduced shipping cost is calculated based upon marketing variables.

4. The method according to claim 3 wherein the marketing variables are comprised of at least one from the group of purchaser name, product purchased, store location, purchaser location, time of product pick up, identity of supplier and history of purchaser's buying in similar prior transactions.

5. The method according to claim 1 wherein the group of benefits further includes:
   a) the opportunity for the purchaser to inspect the product before it is picked up;
   b) the opportunity for the purchaser to delay payment until actually receiving the product;
   c) the opportunity for the purchaser to withhold payment if the product is not acceptable;
   d) the option for the purchaser to select an outlet at which to pick up the product;
   e) the opportunity to select the most convenient remote location in which to pick up a product from among a plurality of outlets;
   f) the opportunity to use a remote location for package pick up or delivery; and
   g) the opportunity to reduce the cost to ship the product in exchange for a guaranteed purchase in the remote location.

6. The method according to claims 3 wherein the reduction in shipping cost is based upon marketing variables comprised of at least one from the group of purchaser name, product purchased, store location, purchaser location, time of product pick up, identity of supplier and history of purchaser's buying in similar prior transactions.

7. The method according to claim 1 wherein the in-store credit is based upon marketing variables comprised of at least one from the group of purchaser name, product purchased, store location, purchaser location, time of product pick up, identity of supplier and history of purchaser's buying in similar prior transactions.

8. The method according to claim 1, wherein the reduction in shipping code is provided by the retail outlet to the purchaser.

9. The method according to claim 1, wherein the reduction in shipping cost is provided by a carrier who will ship the product.

10. The method according to claim 1, wherein the reduction in shipping cost is provided by a carrier who will ship the product.

11. The method according to claim 1, wherein the at least one benefit provided by the retail outlet to a purchaser is calculated by pre-defined criteria provided in advance by the retail outlet to an administrator.

12. The method according to claim 1, wherein the at least one benefit provided by the retail outlet to a purchaser is determined by a query from an administrator to each retail outlet.

13. A computer-implemented method of inducing a purchaser to visit a retail outlet at a remote location upon the purchase of a product from a supplier to pick up the product, the method comprising the steps of:
   a) identifying using a computer a plurality of remote locations as potential outlets;
   b) identifying to the purchaser, through a computer, at least one benefit to the purchaser offered by each of at least two retail outlets to induce the purchaser to visit one of those retail outlets, wherein the at least one benefit from each of the retail outlets is customized based upon information about the purchaser provided prior to pick up of the product, wherein the at least one benefit to the purchaser is one from the group consisting of a reduction in shipping cost for the product, in-store credit provided by the retail outlet and discount coupons provided by the retail outlet, wherein the product must be shipped pursuant to a purchase by the purchaser and wherein the product is supplied from a supplier unrelated by ownership to the retail outlet, and
   c) identifying to the purchaser the correlation of the outlet to the benefits, thereby permitting the purchaser to select an outlet based upon one or more benefits; and
   d) accepting from the purchaser a selection of one of those retail outlets for product pickup based upon the customized benefits offered by the retail outlet to that purchaser.

14. The method according to claim 13 further including the step of arranging for the purchaser to pick up product at the selected outlet.

15. The method according to claim 13 wherein the reduced shipping cost is calculated based upon marketing variables.

16. The method according to claim 15 wherein the marketing variables are comprised of at least one from the group of purchaser name, product purchased, store location, purchaser location, time of product pick up, identity of supplier and history of purchaser's buying in similar prior transactions.

17. The method according to claim 13 wherein the group of benefits further includes:
   a) the opportunity for the purchaser to inspect the product before it is picked up;
   b) the opportunity for the purchaser to delay payment until actually receiving the product;
   c) the opportunity for the purchaser to withhold payment if the product is not acceptable;
   d) the option for the purchaser to select an outlet at which to pick up the product;
   e) the opportunity to select the most convenient remote location in which to pick up a product from among a plurality of outlets;
   f) the opportunity to use a remote location for package pick up or delivery; and
   g) the opportunity to receive reduced shipping cost of the product in exchange for a guaranteed purchase in the remote location.

18. The method according to claim 13 wherein the reduction in shipping cost is based upon marketing variables comprised of at least one from the group of purchaser name, product purchased, store location, purchaser location, time of product pick up, identity of supplier and history of purchaser's buying in similar prior transactions.

19. The method according to claim 13 wherein the in-store credit is based upon marketing variables comprised of at least one from the group of purchaser name, product purchased, store location, purchaser location, time of product pick up, identity of supplier and history of purchaser's buying in similar prior transactions.

20. A computer-implemented method of inducing a purchaser to visit a retail outlet at a remote location to pick up a purchased product, the method comprising the steps of:
   a) identifying using a computer a plurality of retail outlets as potentials product pick up locations;
   b) identifying using a computer a plurality of purchaser benefits that may be desired by a purchaser for selecting an outlet;
   c) identifying, through a computer, at least one benefit to the purchaser offered by each of at least two retail outlets to induce the purchaser to visit one of those retail outlets, wherein the at least one benefit from each of the retail outlets is customized based upon information about the purchaser provided prior to pick up of the product, wherein the at least one benefit to the purchaser is one from the group consisting of a reduction in shipping cost for the product, in-store credit provided by the retail outlet and discount coupons provided by the retail outlet, wherein the product must be shipped pursuant to a purchase by the purchaser and wherein the product is supplied from a supplier unrelated by ownership to the retail outlet;
   d) evaluating using a computer each remote location relative to each purchaser benefit;
   e) identifying using a computer a plurality of benefits to an outlet that may be desired by an outlet serving the purchaser;
   f) evaluating using a computer each purchaser benefit relative to each outlet benefit;
   g) selecting using a computer one or more remote locations based upon a combination of purchaser benefits and outlet benefits;
   h) assigning using a computer a weight to each purchaser benefit and each outlet benefit;
   i) identifying such selected locations to the purchaser and
   j) accepting from the purchaser a selection of one of those retail outlets for product pickup based upon the customized benefits offered by the retail outlet to that purchaser.

21. The method according to claim 20 further including the step of arranging for the purchaser to pick up the product at the selected outlet.

22. The method according to claim 20 wherein the reduced shipping cost is calculated based upon marketing variables.

23. The method according to claim 22 wherein the marketing variables are comprised of at least one from the group of purchaser name, product purchased, store location, purchaser location, time of product pick up, identity of supplier and history of purchaser's buying in similar prior transactions.

24. The method according to claim 20 wherein the benefits to the purchaser further including at least one from the group of benefits comprised of:
   a) the opportunity for the purchaser to inspect the product before it is picked up;
   b) the opportunity for the purchaser to delay payment until actually receiving the product;
   c) the opportunity for the purchaser to withhold payment if the product is not acceptable;
   d) the option for the purchaser to select an outlet at which to pick up the product;
   e) the opportunity to select the most convenient remote location in which to pick up a product from among a plurality of outlets;
   f) the opportunity to use a remote location for package pick up or delivery; and
   g) the opportunity to receive reduced shipping cost of the product in exchange for a guaranteed purchase in the remote location.

25. The method according to claim 20 wherein the reduction in shipping costs is based upon marketing variables comprised of at least one from the group of purchaser name, product purchased, store location, purchaser location, time of product pick up, identity of supplier and history of purchaser's buying in similar prior transactions.

26. The method according to claim 20 wherein the in-store credit based upon marketing variables comprised of at least one from the group of purchaser name, product purchased, store location, purchaser location, time of product pick up, identity of supplier and history of purchaser's buying in similar prior transactions.

27. The method according to claim 20 wherein the step of selecting one or more remote locations as outlets is comprised of assigning a weight to each purchaser benefit and to each outlet benefit and selecting only those outlets which meet pre-specified weighing criteria.

28. A computer-implemented method of inducing a retail outlet to act as a remote location for product pick up by a purchaser, comprising the steps of
   a) identifying to the purchaser, through a computer, at least one benefit to the purchaser offered by each of at least two retail outlets to induce the purchaser to visit one of those retail outlets, wherein the at least one benefit from each of the retail outlets is customized based upon information about the purchaser provided prior to pick up of the product, wherein the product must be shipped pursuant to a purchase by the purchaser and wherein the product is supplied from a supplier unrelated by ownership to the retail outlet;
   b) selecting using a computer at least one of those remote locations as suitable to the purchaser;
   c) accepting from the purchaser a selection of one of those retail outlets for product pickup based upon the customized benefits offered by the retail outlet to that purchaser;
   d) assembling using a computer a purchaser profile based upon information about the purchaser; and
   e) providing some or all of the information in the purchaser profile to the selected retail outlet for direct marketing by the retail outlet to the purchaser.

29. The method according to claim 28 wherein the step of assembling the purchaser profile is performed by extracting information provided by the purchaser, wherein such information is necessary for processing the purchase order and for delivery of the product to a retail outlet.

30. The method according to claims 28 wherein the step of assembling the purchaser profile is performed by extracting information provided by the purchaser, wherein such information is beyond that necessary for processing the purchase order and for delivery of the product to a retail outlet.

31. The method according to claim 28 further including the step of direct marketing to the purchaser based upon information in the purchaser profile.

32. The method according to claim 31 wherein the direct marketing may be provided before, during or after the purchaser visits the selected retail outlet.

33. The method according to claim 32 wherein the direct marketing is comprised of providing to the purchaser at least one benefit from the group consisting of coupons, in-store credit and reduced cost for shipping.

34. The method according to claim 28 wherein one benefit to the purchaser is reduced shipping cost.

35. The method according to claim 34 wherein the reduced shipping cost is calculated based upon marketing variables.

36. The method according to claim 35 wherein marketing variables are comprised of at least one from the group of purchaser name, product purchased, store location, purchaser location, time of product pick up, identity of supplier and history of purchaser's buying in similar prior transactions.

37. The method according to claim 28 wherein a benefit to the purchaser is a reduction in shipping costs and such a reduction is based upon marketing variables comprised of at least one from the group of purchaser name, product purchased, store location, purchaser location and time of product pick up.

38. The method according to claim 28 wherein a benefit to the purchaser is an in-store credit and such a credit is based upon marketing variables comprised of at least one from the group of purchaser name, product purchased, store location, purchaser location and time of product pick up.

39. The method according to claim 28 further including the step of connecting marketing messages to the purchaser prior to, at the time of, or after product pick up.

40. The method according to claim 39 further including basing the marketing messages upon information that is known by an administrator.

41. The method according to claim 40, wherein the step of basing the marketing message upon information that is known by an administrator comprises basing the marketing messages upon at least one from the identity of the purchaser and the time the purchaser will be traveling to a certain retail outlet to drop off a product.

42. A computer-implemented method of direct marketing to individuals visiting a retail outlet at a remote location for pick up of a pre-ordered product, comprising the steps of:
  a) identifying to the purchaser, through a computer, at least one benefit to the purchaser offered by each of at least two retail outlets to induce the purchaser to visit one of those retail outlets, wherein the at least one benefit from each of the retail outlets is customized based upon information about the purchaser provided prior to pick up of the product, wherein the product must be shipped pursuant to a purchase by the purchaser and wherein the product is supplied from a supplier unrelated by ownership to the retail outlet;
  b) accepting from the purchaser a selection of one of those retail outlets for product pickup based upon the customized benefits offered by the retail outlet to that purchaser
  c) informing the store in advance of the purchaser visiting the store;
  d) providing to the retail outlet at least a portion of the information provided by the individual in the course of, or upon, selecting a retail outlet for product pick up but prior to the retail outlet visit; and
  e) using this information to direct market to the individual purchaser before, during or after the retail outlet visit.

43. The method according to claim 42 wherein the direct marketing is comprised of providing at least one from the group of a reduction in shipping cost, in-store credit, customized advertisements and cross-selling opportunities.

44. The method according to claim 43 wherein the direct marketing is comprised of the step of providing a reduction in shipping cost based upon marketing variables.

45. The method according to claim 44 wherein the marketing variables are comprised of at least one from the group of purchaser name, product purchased, retail outlet location, purchaser location, time of product pick up, identity of supplier and history of purchaser's buying in similar prior transactions.

46. The method according to claim 43 wherein the direct marketing is comprised of the step of providing in-store credit based upon marketing variables.

47. The method according to claim 46 wherein the marketing variables are comprised of at least one from the group of purchaser name, product purchased, store location, purchaser location, time of product pick up, identity of supplier and history of purchaser's buying in similar prior transactions.

48. A method of direct marketing to individuals visiting a retail outlet at a remote location to send a product to another destination, comprising the steps of:
  a) identifying to the purchaser, through a computer, at least one benefit to the purchaser offered by each of at least two retail outlets to induce the purchaser to visit one of those retail outlets, wherein the at least one benefit from each of the retail outlets is customized based upon information about the purchaser provided prior to pick up of the product, wherein the product is being shipped to an individual or original supplier of the product which is unrelated by ownership to the retail outlet;
  b) informing the retail outlet in advance an individual will be visiting the retail outlet;
  c) receiving using a computer information about an individual, wherein at least some such information is provided by the individual in the course of or upon selecting a retail outlet for sending a product to another destination but prior to the retail outlet visit; and
  e) using this information to direct market to the individual before, during or after the retail outlet visit.

49. The method according to claim 48 wherein the direct marketing is comprised of providing at least one from the group of a reduction in shipping cost, in-store credit, customized advertisements and cross-selling opportunities.

50. The method according to claim 49 wherein the direct marketing is comprised of the step of providing a reduction in shipping cost based upon marketing variables.

* * * * *

UNITED STATES PATENT AND TRADEMARK OFFICE
CERTIFICATE OF CORRECTION

| | |
|---|---|
| PATENT NO. | : 7,020,623 B1 |
| APPLICATION NO. | : 09/707185 |
| DATED | : March 28, 2005 |
| INVENTOR(S) | : Tiley et al. |

It is certified that error appears in the above-identified patent and that said Letters Patent is hereby corrected as shown below:

<u>On Title page col. 2</u>, See Item (56), References Cited, OTHER PUBLICATIONS, the first document, line 1, "Ssystems Provide" should read -- Systems Provide --
Same Reference, line 3, "Executiv with" should read -- Executive with --

<u>On Title Page,</u> See Item (56), References Cited, OTHER PUBLICATIONS, Page 2, Column 2, delete the last four references as they are duplicates of references already cited.

<u>Column 21</u>, delete Claim 2, lines 5-10 and insert the following:
--    2.    The method according to claim 1 further comprising the step of arranging for the purchaser to pick up the product at the selected outlet. --

<u>Column 21</u>, Claim 6, Line 37, "to claims 3" should read -- to claim 3 --

<u>Column 21</u>, Claim 8, Line 50, "shipping code" should read -- shipping cost --

<u>Column 21</u>, delete Claim 10, Lines 55-57 and insert the following:
--    10.    The method according to claim 1, wherein the reduction in shipping cost is provided by the supplier of the product to be shipped. --

<u>Column 23</u>, Claim 20, Line 5, "as potentials product pick up locations" should read -- as potential product pick up locations --

<u>Column 24</u>, Claim 30, Line 50, "to claims 28" should read -- to claim 28 --

<u>Column 26</u>, Claim 47, Line 21, "purchased, store location" should read -- purchased, retail outlet location --

UNITED STATES PATENT AND TRADEMARK OFFICE
CERTIFICATE OF CORRECTION

PATENT NO.      : 7,020,623 B1
APPLICATION NO. : 09/707185
DATED           : March 28, 2005
INVENTOR(S)     : Tiley et al.

It is certified that error appears in the above-identified patent and that said Letters Patent is hereby corrected as shown below:

<u>Column 26</u>, Claim 48, Line 45, "e) using this" should read -- d) using this --

Signed and Sealed this

Fifteenth Day of August, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,020,623 B1 | Page 1 of 2 |
| APPLICATION NO. | : 09/707185 | |
| DATED | : March 28, 2006 | |
| INVENTOR(S) | : Tiley et al. | |

It is certified that error appears in the above-identified patent and that said Letters Patent is hereby corrected as shown below:

<u>On Title page col. 2</u>, See Item (56), References Cited, OTHER PUBLICATIONS, the first document, line 1, "Ssystems Provide" should read -- Systems Provide --
Same Reference, line 3, "Executiv with" should read -- Executive with --

<u>On Title Page,</u> See Item (56), References Cited, OTHER PUBLICATIONS, Page 2, Column 2, delete the last four references as they are duplicates of references already cited.

<u>Column 21</u>, delete Claim 2, lines 5-10 and insert the follwing:
--    2.    The method according to claim 1 further comprising the step of arranging for the purchaser to pick up the product at the selected outlet. --

<u>Column 21</u>, Claim 6, Line 37, "to claims 3" should read -- to claim 3 --

<u>Column 21</u>, Claim 8, Line 50, "shipping code" should read -- shipping cost --

<u>Column 21</u>, delete Claim 10, Lines 55-57 and insert the following:
--    10.    The method according to claim 1, wherein the reduction in shipping cost is provided by the supplier of the product to be shipped. --

<u>Column 23</u>, Claim 20, Line 5, "as potentials product pick up locations" should read -- as potential product pick up locations --

<u>Column 24</u>, Claim 30, Line 50, "to claims 28" should read -- to claim 28 --

UNITED STATES PATENT AND TRADEMARK OFFICE
CERTIFICATE OF CORRECTION

PATENT NO. : 7,020,623 B1
APPLICATION NO. : 09/707185
DATED : March 28, 2006
INVENTOR(S) : Tiley et al.

It is certified that error appears in the above-identified patent and that said Letters Patent is hereby corrected as shown below:

Column 26, Claim 47, Line 21, "purchased, store location" should read -- purchased, retail outlet location --

Column 26, Claim 48, Line 45, "e) using this" should read -- d) using this --

This certificate supersedes Certificate of Correction issued August 15, 2006.

Signed and Sealed this

Nineteenth Day of September, 2006

JON W. DUDAS
*Director of the United States Patent and Trademark Office*